Patented Mar. 7, 1939

2,150,140

UNITED STATES PATENT OFFICE 2,150,140

DERIVATIVES OF ASCORBIC ACID HAVING AN ANTISCORBUTIC ACTION AND PROCESS FOR THE MANUFACTURE OF SAME

Kurt Warnat, Basel, Switzerland, assignor to Hoffmann-La Roche, Inc., Nutley, N. J., a corporation of New Jersey No Drawing. Application February 8, 1938, Serial No. 189,444. In Germany April 24, 1937

7 Claims. (Cl. 260—344)

It has been found that by the action of aroyl halides on ascorbic acid, derivatives having an antiscorbutic action are obtained. This reaction most probably takes the following course:

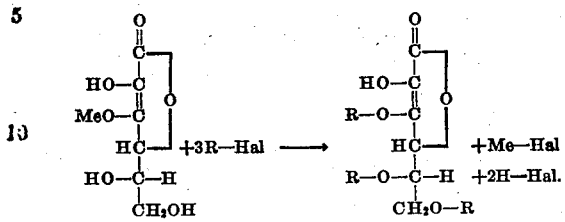

Me stands for hydrogen or alkali-metal, R comprises the benzoyl and substituted benzoyl radicals. The new compounds are more stable to oxidising agents than ascorbic acid itself, so that they can be used for many purposes for which ascorbic acid cannot be employed owing to its instability. They are indifferent to iodine solution. By heating with caustic alkalis they are gradually hydrolysed. They are to be used medicinally.

Example 1

20 parts by weight of sodium ascorbate and 50 parts by weight of benzoyl chloride are heated to 60–80° C. When the condensation is completed, the reaction mass is treated with 100 parts by weight of warm water. The condensation product remains undissolved while unchanged ascorbic acid dissolves. The crude product is recrystallised from dilute alcohol.. It crystallises in colorless flakes melting at 188–189° C. Benzoyl ascorbic acid is difficultly soluble in cold and warm water, easily soluble in warm alcohol and slightly soluble in ether. In contrast to ascorbic acid it does not reduce iodine solution. The formula of this new compound is $C_{27}H_{20}O_9$, which is proved by analysis Calculated, C 66.37% H 4.14%;
Found, C 66.10% H 4.47%.

Example 2

10 parts by weight of sodium ascorbate are heated with 20 parts by weight of veratroyl chloride to 90–100° C. The reaction mass is then treated with water and the residue insoluble in water recrystallised from alcohol. Veratroyl ascorbic acid, which is difficultly soluble in alcohol, is obtained in needles which after having been dried sinter at 96–98° C. The compound is indifferent to iodine solution, but is hydrolysed by warm alakali. The formula of this new compound is $C_{33}H_{32}O_{15}$, which is proved by analysis Calculated, C 59.27% H 4.82% $OCH_3$ 27.84%;
Found, C 59.20% H 5.10% $OCH_3$ 27.38%.

Example 3

20 parts by weight of ascorbic acid in 25 parts by weight of pyridine are treated with 45 parts by weight of benzoyl chloride at 70–80° C. The mass which solidifies in the cold is dissolved in 80 parts by weight of hot alcohol and cooled. Then 250 parts by weight of 5% hydrochloric acid are added and the aqueous layer removed. The precipitated oil is dissolved in little alcohol from which, after a while, benzoyl ascorbic acid described in Example 1 is separated in crystalline form. It is recrystallised from alcohol or methyl alcohol and melts at 188–189° C.

Example 4

100 parts by weight of sodium ascorbate are added in portions to 350 parts by weight of benzoyl chloride which has been heated to about 70° C., whereafter reaction sets in with evolution of heat. Heating is performed at 110° C. until the mass has solidified. Then excess of benzoyl chloride is distilled off in vacuo and the solid residue extracted with boiling toluene. On cooling, benzoyl ascorbic acid crystallises from the toluene solution. For further purification it is recrystallised from alcohol. Melting point 188–189° C.

I claim:

1. A compound selected from the group of substances having the structure:

```
        CO—
        |
    HO—C
        ||
    RO—C    O
        |
     H—C
        |
    RO—CH—
        |
       CH₂OR
``` wherein R is a radical selected from the group consisting of benzoyl and substituted benzoyl radicals.

2. Benzoyl ascorbic acid having the structure:

```
           CO—
           |
       HO—C
           ||
⟨  ⟩—COO—C    O
           |
        H—C
           |
⟨  ⟩—COO—CH
           |
          CH₂—COO—⟨  ⟩
```

3. Veratroyl ascorbic acid having the structure:

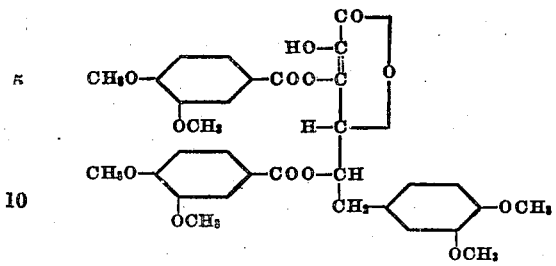

4. The process for the manufacture of a compound of the general formula

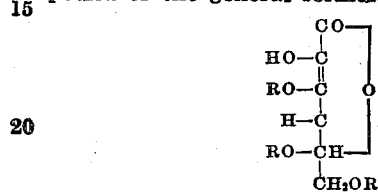

wherein R is a radical selected from the group consisting of benzoyl and substituted benzoyl radicals, which comprises treating a substance selected from the group consisting of ascorbic acid and its salts with a substance selected from the group of benzoyl and substituted benzoyl halides.

5. The process for the manufacture of a compound of the general formula

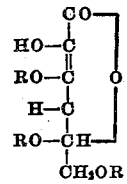

wherein R is a radical selected from the group consisting of benzoyl or substituted benzoyl radicals which comprises treating a substance selected from the group of ascorbic acid and its salts with a substance selected from the group consisting of benzoyl and substituted benzoyl halides in the presence of pyridine.

6. The process for the manufacture of benzoyl ascorbic acid which comprises heating a salt of ascorbic acid with benzoyl chloride.

7. The process of preparing benzoyl ascorbic acid which comprises treating ascorbic acid with benzoyl chloride in the presence of pyridine.

KURT WARNAT.